United States Patent
McNair

[15] 3,664,103
[45] May 23, 1972

[54] MOWER CONSTRUCTION

[72] Inventor: Waldo D. McNair, 514 Ash Street, Myrtle Point, Oreg. 97458

[22] Filed: July 1, 1970

[21] Appl. No.: 51,636

Related U.S. Application Data

[63] Continuation-in-part of Ser. No. 807,738, Mar. 17, 1969, abandoned.

[52] U.S. Cl. ................................56/298, 56/300, 56/303, 56/311, 56/314
[51] Int. Cl. ........................................................A01d 55/02
[58] Field of Search ..........................................56/296–320

[56] References Cited

UNITED STATES PATENTS

| | | | |
|---|---|---|---|
| 173,851 | 2/1876 | Freeman | 56/296 UX |
| 2,791,085 | 5/1957 | Lewis | 56/296 |
| 662,442 | 11/1900 | Jennings et al. | 56/303 |
| 34,213 | 1/1862 | Morse | 56/320 |
| 668,486 | 2/1901 | Brown | 56/302 |
| 2,803,104 | 8/1957 | Simpson | 56/303 |
| 3,098,338 | 7/1963 | Myers | 56/296 |
| 3,284,994 | 11/1966 | Hamel | 56/298 |

FOREIGN PATENTS OR APPLICATIONS

| | | | |
|---|---|---|---|
| 222,447 | 7/1959 | Australia | 56/296 |
| 29,490 | 1/1958 | Finland | 56/303 |

*Primary Examiner*—F. Barry Shay
*Assistant Examiner*—J. A. Oliff
*Attorney*—Clarence A. O'Brien and Harvey B. Jacobson

[57] ABSTRACT

A mower bar construction including a toothed elongated stationary support bar and an elongated toothed mounting bar guidingly supported from the support bar for longitudinal reciprocation relative thereto. The teeth on the support bar overlie the teeth on the mounting bar and the latter includes an elongated upwardly opening guideway in which the mounting bar is reciprocally received. The support bar includes structure by which the effective width of the guideway may be varied and the outer end of the mower bar construction includes a rearwardly and downwardly inclined outer shoe for contact with the ground whose rear end may be adjusted in elevation. In addition the outer end of the mower bar construction includes an upstanding rearwardly projecting and inwardly inclined swath plate constructed of stiff but resilient material and provided with a rearwardly and upwardly inclined resilient swath strake or stick that is also slightly inwardly inclined at its rear end. Further, the corresponding base and head ends of the support and mounting bars are provided with coacting guide surfaces including a shallow longitudinal recess formed in the support bar in which the head end of the mounting bar is captively retained for longitudinal reciprocation and the recess includes a bottom longitudinal groove or channel in which a depending rib carried by the head end of the mounting bar is reciprocally received.

8 Claims, 16 Drawing Figures

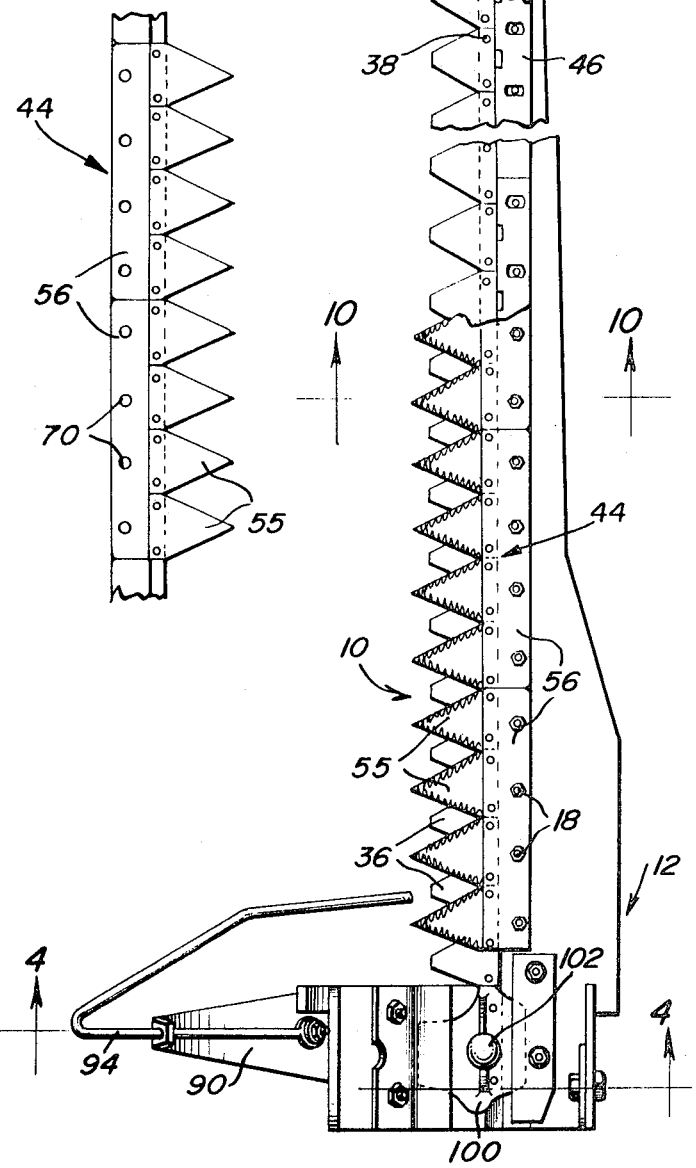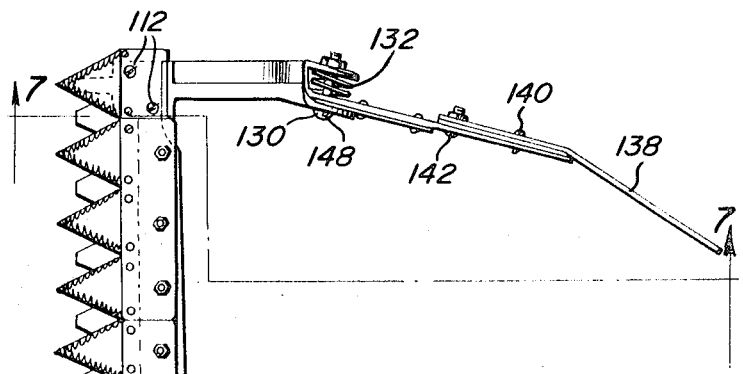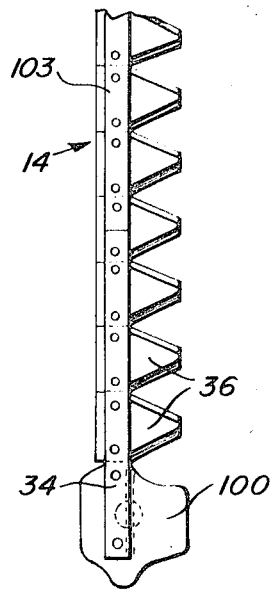
Fig. 1
Fig. 2
Fig. 3
Waldo D. McNair
INVENTOR

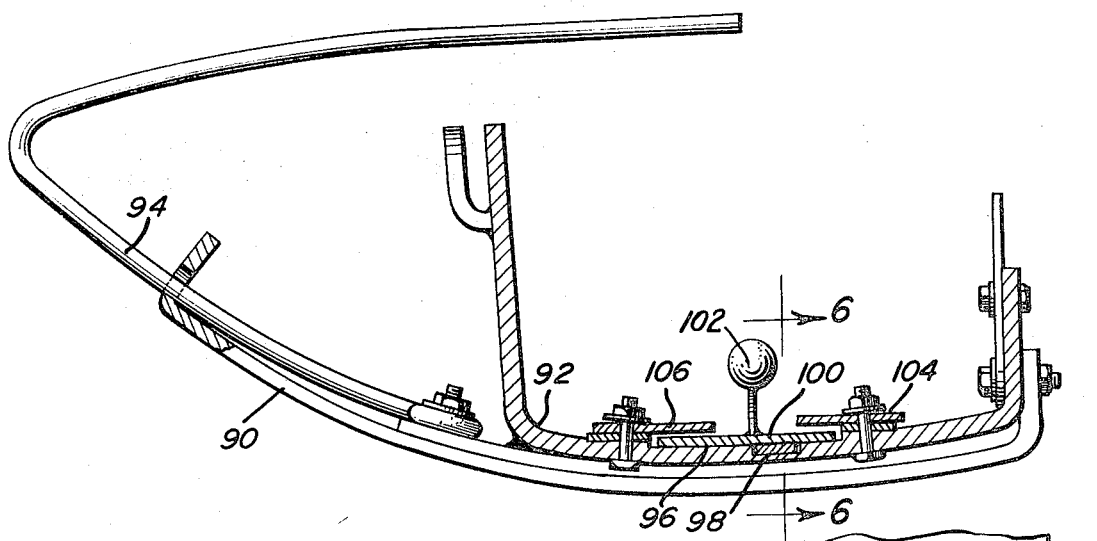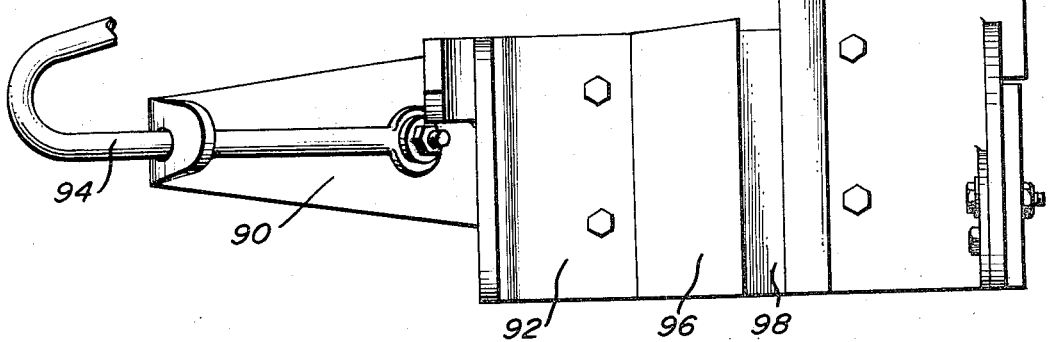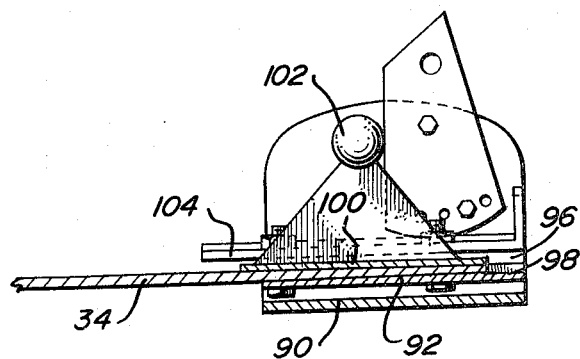

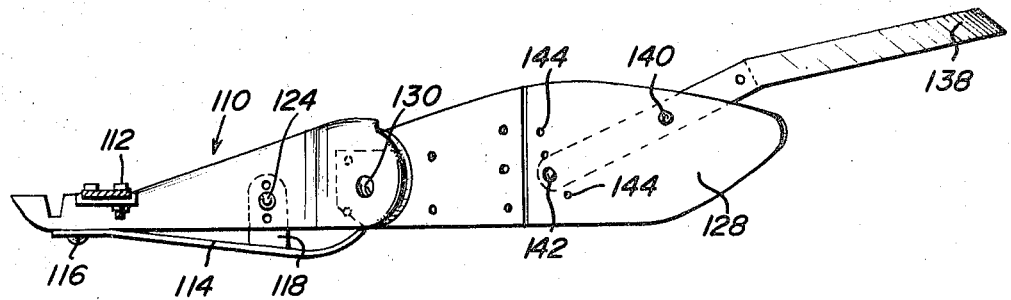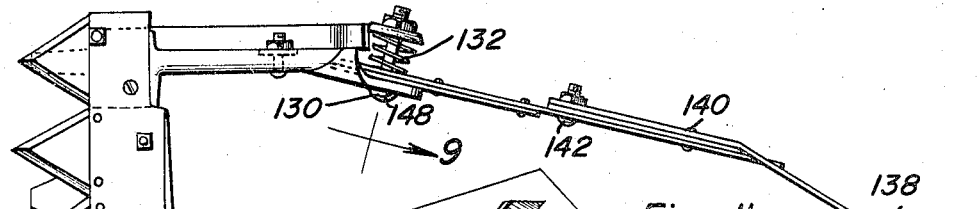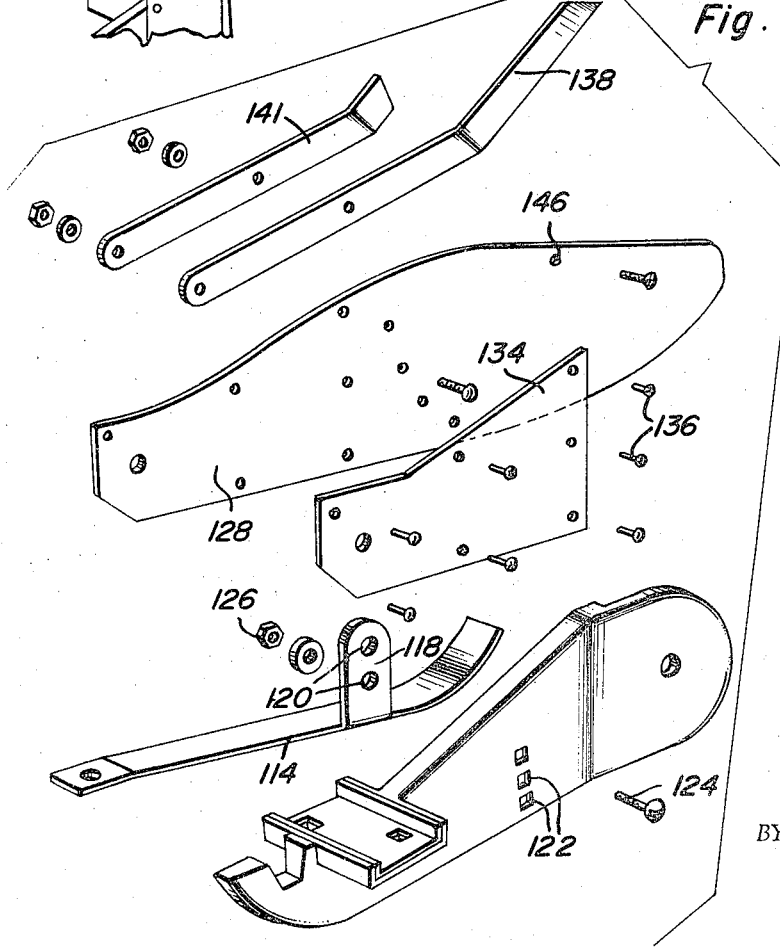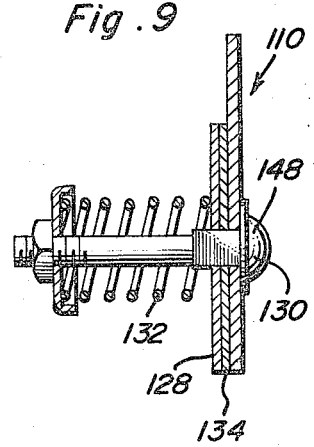

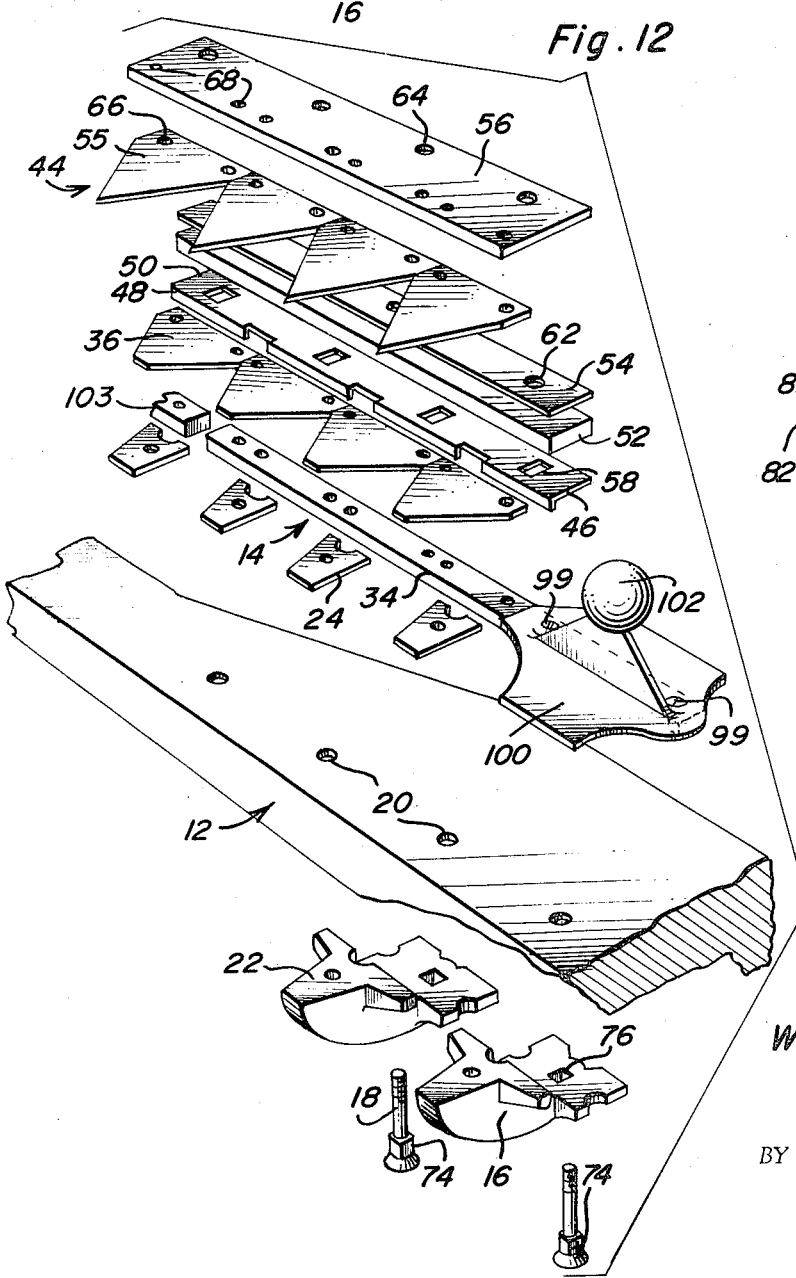

MOWER CONSTRUCTION

This application comprises a continuation-in-part of my copending U.S. application Ser. No. 807,738, filed Mar. 17, 1969, now abandoned, for Sickle Bar Construction.

The sickle bar construction of the instant invention is novel in that it is provided with lower teeth which are reciprocally mounted and stationary upper teeth which are supported from and may be adjustably positioned transversely of the associated mower bar. As will be hereinafter more fully set forth, the upper cutter teeth are secured in groups to a plurality of support bars mounted on and adjustable relative to the associated mower bar. In addition, the lower teeth are supported from an elongated reciprocally supported mounting bar and are captively retained in position by the upper teeth, the front face of the mower bar and spaced guides carried by the mower bar. Accordingly, removal of the upper teeth and their supporting support bars provides ready access to the mounting bar and its removal together with the lower teeth mounted thereon.

The main object of this invention is to provide a sickle bar construction which will perform in an improved manner and which includes structural features enabling the upper cutting teeth to be quite readily serviced and replaced.

Another object of this invention, in accordance with the immediately preceding object, is to provide a sickle bar construction including novel means for retaining the lower reciprocal cutter teeth thereof in operative association with the readily removable upper cutting teeth.

Another important object of this invention is to provide a sickle bar construction provided with stationary upper cutting teeth and reciprocal lower cutting teeth whose rear ends are guided by a wear plate supported from the mower bar and whose forward ends are disposed forward of the associated bar and lap over wear plates supported from guides spaced longitudinally along the mower bar.

A further object of this invention is to provide a mower bar construction including an outer end support shoe which is adjustable in nature and which may therefore be adjusted when needed according to the mowing operation being performed.

Another important object of this invention is to provide a mower bar construction including a resilient outer end swath plate and an accompanying rearwardly and upwardly inclined grass or swath stick which is also constructed so as to be resilient.

A further object of this invention is to provide a mower bar construction in accordance with the preceding objects and including base and head ends of the support and mounting bars thereof including coacting portions acting to provide an improved guiding action on the mounting bar for reciprocation of the latter relative to the support bar.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the improved mower construction of the instant invention with intermediate portions of the mower bar being broken away;

FIG. 2 is a bottom plan view of a plurality of aligned cutter plate sections with upper cutter teeth secured thereto;

FIG. 3 is a fragmentary bottom plan view of the head end of the reciprocal mounting bar and the lower teeth mounted thereon;

FIG. 4 is an enlarged transverse vertical sectional view taken substantially upon the plane indicated by the section line 4—4 of FIG. 1;

FIG. 5 is an enlarged fragmentary view of the lower portion of FIG. 1 with the reciprocal mounting bar removed;

FIG. 6 is a fragmentary longitudinal sectional view taken substantially upon the plane indicated by the section line 6—6 of FIG. 4;

FIG. 7 is a fragmentary enlarged vertical sectional view taken substantially upon the plane indicated by the section line 7—7 of FIG. 1;

FIG. 8 is an enlarged fragmentary top plan view of the outer end of the mower bar construction;

FIG. 9 is an enlarged fragmentary vertical sectional view taken substantially upon the plane indicated by the section line 9—9 of FIG 8;

FIG. 10 is an enlarged vertical sectional view taken substantially upon the plane indicated by the section line 10—10 of FIG. 1;

FIG. 11 is an exploded perspective view of the outer end of the improved mower bar construction;

FIG. 12 is a fragmentary exploded perspective view of the base end portion of the mower bar construction; and FIGS. 13 through 16 are top plan views of various forms of top cutter teeth which may be used in conjunction with the mower construction.

Referring now more specifically to the drawings, the numeral 10 generally designates the mower bar construction of the instant invention. The construction 10 utilizes some of the basic structural and operational features of the sickle bar construction disclosed in my copending U.S. application Ser. No. 807,738, filed Mar. 17, 1969, now abandoned, and may be considered as based upon a conventional Ford Series 501 Rear Attached Mower, although other basic mower constructions may be utilized.

The mower bar construction 10 includes a mower or support bar referred to in general by the reference numeral 12 and a mounting or sickle bar referred to in general by the reference numeral 14. A plurality of nose or forward end shortened guides 16 are secured to the forward edge portion of the support bar 12 by means of suitable fasteners 18 secured through the guide 16 and suitable apertures or bores 20 formed through the support bar 12. The guides 26 are disposed in side-by-side relation spaced along the support bar and the horizontal upper surface 22 of the forward or nose end of each guide 16 has a wear plate 24 secured thereto by means of a rivet type fastener 26 secured through the wear plate 24 and a bore 28 formed in the corresponding guide 16. As may be seen from FIG. 10 of the drawings, the guides 16 include horizontal notches 30 in which the forward lower corner portions of the support bar 12 are seated. In addition, the guides 16 define aligned grooves or notches 32.

The mower knife or mounting bar 14 includes a head end section 34 and a plurality of lower sickle teeth 36 are secured along the mounting bar 14 in side-by-side relation by means of rivets 38 with the rear edges of the sickle teeth 36 lapping over the upper surface of the mower knife or mounting bar 14. The lower teeth 36 are secured to the mounting bar 14 in a manner such that one of the teeth overlaps the head end section 34 as well as the adjacent section of the mounting bar 14 whereby the adjacent section and the head end section are secured together for simultaneous reciprocation.

The mounting bar 14 is cradled in the notches or grooves 32 with the undersurface portions 40 of the lower teeth 36 disposed in surface-to-surface sliding contacting engagement with the upper surfaces of the wear plates 24. It will be noted from FIG. 10 that the rear ends of the wear plates 24 project horizontally into the recesses or notches 32.

A plurality of sets of upper teeth assemblies referred to in general by the reference numerals 44 are provided and each assembly 44 includes an L-shaped wear plate 46 including vertical and horizontal flange portions 48 and 50, a clearance plate 52, a shim 54, four upper sickle teeth 55 and a top cutter plate 56. The wear plates 46 are provided with longitudinally spaced slots 58 in the horizontal flange portions 50 thereof, the clearance plates and shims include longitudinally spaced bores 60 and 62 which are registrable with the corresponding slots 58 and the top cutter plates each includes a plurality of longitudinally spaced bores 64 which are registrable with the corresponding bores 62. Further, each of the upper sickle teeth 55 includes a pair of bores 66 which are registrable in corresponding bores 68 formed in the associated top cutter plate 56.

Rivets 70 are utilized to secure the teeth 55 to the various cutter plates 56 and the upper ends of the fasteners 18 pass through the slots 58, the bores 60 and 62 formed in the plates 52 and the shims 54 and also through the bores 64 formed in the top cutter plates 56. Threaded elements 72 in the form of nuts are threadedly engaged with the upper threaded shank portions of the fasteners 18. Further, it will be noted that the lower ends of the fasteners 18 include square shank portions 74 which are received upwardly through square openings 76 provided therefor in the guides 16.

With attention now invited more specifically to FIG. 10 of the drawings it may be seen that the vertical flange portions 48 of the wear plates 46 project downwardly in front of the front face of the support bar 12 and that the mounting bar 14 is slidably received between the forward faces of the vertical flange portions 48 and the rear vertical edges of the wear plates 24. Inasmuch as the wear plates 46 include the slots 58, the wear plates 46 may be shifted so as to vary the effective width of the passage defined by the notches 32 in which the mounting bar 14 is disposed.

The upper peripheral edge portions of the upper teeth 56 are beveled as at 56' and the lower peripheral edge portions of the lower teeth 36 are beveled as at 36'.

With attention now invited more specifically to FIGS. 14 through 16, there will be seen modified forms of upper teeth 80, 82 and 84. The teeth 80 include serrated and slightly arcuate forwardly converging side beveled edges 80' whereas the teeth 82 include forwardly convergent straight beveled surfaces 82' which terminate in a point 82'' and are therefore similar to the teeth 55 whose straight beveled edges 56' are forwardly convergent. Also, the teeth 84 include straight forwardly convergent beveled surfaces 84' which terminate forwardly in a rounded point 84''. Accordingly, it may be seen that various shapes of upper teeth may be utilized in the mower bar construction 10. Further, various forms of lower cutting teeth may also be utilized.

With attention now invited more specifically to FIGS. 4 through 6 of the drawings it may be seen that the inner end of the mower bar construction 10 is substantially conventional in that it includes an inner shoe 90 carried by the base end portion 92 of the support bar 12. Also, a grass rod 94 is provided and supported from the inner shoe 90 and from FIGS. 4 and 5 of the drawings it may be seen that the inner end portion or base end portion 92 includes a shallow recess 96 including a central deeper groove 98.

The head end section 34 of the mounting bar 14 is secured by fasteners 99, see FIG. 12, to a head plate portion 100 from which a ball member 102 is supported. The head plate portion 100 is slidably seated in both sides of the recess 96 and the head end portion 34 of the mounting bar 14. Three of the teeth 36 are secured to the head end portion 34 and a fourth tooth 36 is secured to both the end portion 34 and the adjacent portion 103 of the mounting bar 14. A pair of retaining plates 104 and 106, such as those conventionally provided, serve to maintain the head plate portion 100 captive within the recess 96. However, the conventional head end section corresponding to section 34 does not include the recess 96 or the groove 98 and merely relies upon the plates 104 and 106 to guidingly support the head plate portion 100 from the inner end portion 92.

Other than the recess 96 and groove 98, the base end portion of the mower bar construction 10 is conventional.

Referring now more specifically to FIGS. 1 and 7–11 of the drawings, it may be seen that the mower bar construction includes a rigid outer end shoe referred to in general by the reference numeral 110 which is secured to the outer end of the support bar 12 by means of suitable fasteners 112. The outer shoe 110 includes front and rear ends and the outer end of the support bar 12 is secured to the front end of the outer shoe 110. In addition, the forward end of an elongated stiff runner 114 is secured to the undersurface of the outer shoe 110 as at 116 and the rear end of the runner 114 includes an upstanding flange 118 in which vertically spaced apertures 120 are formed and which are registrable with vertically spaced openings 122 formed in the outer shoe 110. A suitable fastener 124 is utilized to secure the flange 118 in vertically adjusted position relative to the outer shoe 110 with the fastener 124 being secured through one of the openings 122 and one of the apertures 120 by means of a threaded nut 126. Accordingly, the outer end of the support bar 112 may be adjusted in height relative to the ground over which the rear end of the outer shoe 110 rides.

Although a conventional mower bar construction is provided with a swath board, these swath boards are for the most part constructed of wood and rigid so that they will not bend. However, the mower bar construction 10 includes a flexible swath plate 128 pivotally supported from the rear end of the outer shoe 110 by means of a pivot connection 130 including a compression spring 132 and the swath plate 128 is constructed of a metallic panel. The swath plate 128 includes a flexible reinforcing plate 134 secured thereto by means of suitable fasteners 136 and the rear end of the swath plate 128 has a flexible grass stick or swath strake 138 secured thereto by means of a pivot fastener 140 secured through the swath strake intermediate its opposite ends and also through a rear end portion of the swath plate 128. The forward end of the grass stick or swath strake 138 is backed by means of a flexible strip 141 and secured in adjusted rotated position by means of a fastener 142 secured through the grass stick or swath strake and one of the apertures 144 formed through the swath plate on an arcuate path whose center of curvature coincides with the opening 146 through the swath plate in which the fastener 140 is received.

It will be noted that the pivot connection 130 includes a pivot bolt 148 which passes not only through the swath plate 128 but also through the reinforcing plate 134.

The rear end portion of the grass stick 138 which projects above the upper marginal edge portion of the swath plate 128 is inclined slightly inwardly relative to the swath plate 128 toward the inner end of the mower bar construction 10. Also, it may be seen from FIG. 8 of the drawings that the swath plate 128 is inclined inwardly at its rear end toward the inner end of the mower bar construction 10.

The grass stick 138 is also constructed of a metallic material so as to be stiff but somewhat flexible and accordingly, the swath plate and grass stick operate in an improved manner enabling them to yield under excess side pressures.

It is of course to be understood that the pitman (not shown) of the mower bar construction 10 is attached to the ball or ball element 102 whereby the mounting bar 14 is reciprocated relative to the support bar 12 with the lower teeth 36 disposed in cutting shear relation with the upper teeth 55. By providing the mower bar construction 10 with a plurality of closely spaced side-by-side guides 16, an extremely durable mower bar construction is achieved. Further, because of the various wear plates and the shim 54, the mower bar construction 10 may be adjusted as needed in order to maintain proper guiding action on the lower teeth 36 and the teeth 55 and 36 in proper surface-to-surface guiding contacting engagement with each other. Additionally, because of the recess 96 and the groove 48, the head plate portion 100 of the mounting bar 14 is more precisely guided for longitudinal reciprocation and the improved swath plate and grass stick construction carried by the outer end of the mower bar construction 10 results in more efficient operation.

The adjustable runner 114 enables further adjustment of the mower bar construction 10 according to the specific mowing operation to be performed and the large number of guides 16 utilized not only serves to provide a more precise guiding action on the reciprocal mounting bar 14 but also to provide a heavy strain withstanding forward edge portion of the mower bar construction 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. A sickle bar construction comprising an elongated support bar having upper and lower faces, front and rear faces and provided with stationary forwardly horizontally outwardly projecting guide supports spaced longitudinally along its front face and including forward coplanar upwardly facing bearing surfaces and upwardly opening and aligned transverse notches adjacent their rear base ends forming an elongated and upwardly opening guideway extending along the front face of said bar, a plurality of first upwardly offset and forwardly projecting upper cutter blades stationarily supported in cantilever manner from said bar and spaced longitudinally therealong, and an elongated mounting bar guidingly and reciprocally disposed in and projecting upwardly from said guideway, and a plurality of second forwardly projecting lower cutter blades secured to said mounting bar for reciprocation therewith and underlying and disposed in surface to surface sliding and shearing relation with the first cutter blades and also disposed in surface to surface sliding relation with said bearing surfaces, said support bar and said mounting bar including corresponding base and head ends, respectively, said head end of said mounting bar including a base plate portion including generally parallel opposite longitudinal side edges extending longitudinally thereof and a depending longitudinal ridge, said base end of said support bar including an upwardly opening and longitudinally extending wide and shallow recess in which said base plate portion is seated for guided reciprocal movement and also an elongated trough opening upwardly into the bottom of said recess in which said ridge is received for guided reciprocal movement, and a pair of guide plates supported from said base end of said support bar on opposite sides of said recess and projecting inwardly toward each other and overlying the opposite longitudinal side edge portions of said base plate portion.

2. The combination of claim 1 wherein the end of said support bar remote from the base end thereof includes an elongated support shoe extending transversely thereof beneath said remote end and including front and rear ends, the front end of said shoe being stationarily secured to said remote end and the rear end of said shoe being supported from said remote end for vertical adjustment relative thereto, said shoe being stiff but flexible and therefore bendable intermediate its front and rear ends.

3. The combination of claim 2, said remote end also including front and rear sides, an elongated upstanding stiff but flexible swath plate carried by said remote end and projecting rearwardly therefrom, at least the rear end portion of said swath plate being inclined slightly toward said base end of said support bar.

4. The combination of claim 3 wherein said support bar includes means for adjusting the effective width of said guideway.

5. A sickle bar construction comprising an elongated support bar having upper and lower faces, front and rear faces and provided with stationary forwardly horizontally outwardly projecting guide supports spaced longitudinally along its front face and including forward coplanar upwardly facing bearing surfaces and upwardly opening and aligned transverse notches adjacent their rear base ends forming an elongated and upwardly opening guideway extending along the front face of said bar, a plurality of first upwardly offset and forwardly projecting upper cutter blades stationarily supported in cantilever manner from said bar and spaced longitudinally therealong, and an elongated mounting bar guidingly and reciprocally disposed in and projecting upwardly from said guideway, and a plurality of second forwardly projecting lower cutter blades secured to said mounting bar for reciprocation therewith and underlying and disposed in surface to surface sliding and shearing relation with the first cutter blades and also disposed in surface to surface sliding relation with said bearing surfaces, said support bar including means for adjusting the effective width of said guideway.

6. The combination of claim 5 wherein the outer ends of said guide supports include upwardly facing generally horizontal surfaces to which a plurality of wear plates are secured, the second cutter blades including undersurface portions thereof disposed in sliding contact with the upper surface portions of said wear plates.

7. The combination of claim 5 including a plurality of elongated and generally aligned mounting plates, the first-mentioned cutting teeth being secured, in groups, to said mounting plates with the teeth of each group of teeth spaced along the corresponding mounting plate, and mounting means mounting said plates on said support bar for adjustable lateral front to rear shifting relative to said support bar.

8. The combination of claim 7 wherein said mounting means includes means removably supporting each of said plates on said support bar for replacement independent of removal of the other plates.

* * * * *